BROAD BAND NONRECIPROCAL TRANSMISSION DEVICE

Filed June 13, 1955 2 Sheets-Sheet 1

INVENTORS H. BOYET
S. WEISBAUM
BY
Franklin Mohr
ATTORNEY

BROAD BAND NONRECIPROCAL TRANSMISSION DEVICE

Filed June 13, 1955 2 Sheets-Sheet 2

FIG. 4

$$\begin{vmatrix}
\sin k_a a & -e^{jk_m a} & -e^{-jk_m a} & 0 & 0 & 0 & 0 & 0 \\
-jk_a \cos k_a a & -\left(\rho k_m - \frac{jK\rho\beta}{\mu}\right)e^{jk_m a} & \left(\rho k_m + \frac{jK\rho\beta}{\mu}\right)e^{-jk_m a} & 0 & 0 & 0 & 0 & 0 \\
0 & e^{jk_m(a+d_1)} & e^{-jk_m(a+d_1)} & -\cos k_a(a+d_1) & -\sin k_a(a+d_1) & 0 & 0 & 0 \\
0 & \left(\rho k_m - \frac{jK\rho\beta}{\mu}\right)e^{jk_m(a+d_1)} & -\left(\rho k_m + \frac{jK\rho\beta}{\mu}\right)e^{-jk_m(a+d_1)} & -jk_a \sin k_a(a+d_1) & jk_a \cos k_a(a+d_1) & 0 & 0 & 0 \\
0 & 0 & 0 & \cos k_a(l-b-d_2) & \sin k_a(l-b-d_2) & -e^{jk'_m(l-b-d_2)} & -e^{-jk'_m(l-b-d_2)} & 0 \\
0 & 0 & 0 & jk_a \sin k_a(l-b-d_2) & -jk_a \cos k_a(l-b-d_2) & -\left(\rho k'_m - \frac{jK'\rho\beta}{\mu'}\right)e^{jk'_m(l-b-d_2)} & \left(\rho k'_m + \frac{jK'\rho\beta}{\mu'}\right)e^{-jk'_m(l-b-d_2)} & 0 \\
0 & 0 & 0 & 0 & 0 & e^{jk'_m(l-b)} & e^{-jk'_m(l-b)} & -\sin k_a b \\
0 & 0 & 0 & 0 & 0 & \left(\rho k'_m - \frac{jK'\rho\beta}{\mu'}\right)e^{jk'_m(l-b)} & -\left(\rho k'_m + \frac{jK'\rho\beta}{\mu'}\right)e^{-jk'_m(l-b)} & -jk_a \cos k_a b
\end{vmatrix} = 0$$

INVENTORS H. BOYET
S. WEISBAUM
BY Franklin Mohr
ATTORNEY

United States Patent Office 2,923,899
Patented Feb. 2, 1960

2,923,899

BROAD BAND NONRECIPROCAL TRANSMISSION DEVICE

Howard Boyet, New York, N.Y., and Samuel Weisbaum, Morristown, N.J., assignors to Bell Telephone Laboratories, Incorporated, New York, N.Y., a corporation of New York Application June 13, 1955, Serial No. 514,962

5 Claims. (Cl. 333—31)

This invention relates to electromagnetic wave transmission devices and more particularly to those devices commonly designated nonreciprocal, i.e. those wherein the transmission characteristics for waves transmitted in one direction through the device are different from the transmission characteristics for waves transmitted in the opposite direction.

A general object of the invention is to increase the range of satisfactory operation of nonreciprocal devices with respect to change of operating frequency, change of ambient temperature or other change in operating conditions.

A particular object is to regulate the nonreciprocal differential phase shift produced by a gyromagnetic element such as a ferrite slab so that substantially uniform operating characteristics are obtained over a broad band of operating frequencies.

It has been known in the art to employ two ferrite slabs of different transmission properties in different portions of a wave guide system in order to effect a compensation for varying frequency, temperature, or other operating condition, the effects of which are different for the two slabs. In particular, it has been suggested that the two slabs be arranged in serial or tandem relationship to each other within successive portions of a wave guide, each slab having its individual magnetizing arrangements.

In accordance with the present invention, two gyromagnetic elements are mounted in what may be regarded as a parallel arrangement within one and the same longitudinal portion of a wave guide. The elements are preferably placed on opposite sides of the medial plane of the wave guide so that the axial space taken up by the two elements is no greater than the axial space taken up by the longer of the two elements. Either a common source or individual sources of externally applied magnetizing field are arranged to magnetize both gyromagnetic elements in the same sense although it may be in different field strengths. Inasmuch as the wave which is propagated through the wave guide has a rotating magnetic component which rotates in opposite senses on the two sides of the medial plane, the relationship between the sense of the externally applied magnetizing field and the sense of rotation of the propagated wave is opposite on the two sides of the medial plane. The result is that a differential effect is obtained by the combined use of the two gyromagnetic elements. This differential effect is utilized to effect compensation for frequency or temperature variations or the like.

In the drawings,

Fig. 4 is a mathematical determinantal equation for a wave guide structure such as that shown in Fig. 3.

A single slab of magnetized ferrite in a wave guide produces phase constants per unit length which are generally different for the two directions of propagation in the wave guide. These phase constants may be designated $\beta_+$ and $\beta_-$, respectively, for the positive and negative directions. The difference between $\beta_+$ and $\beta_-$ is called the differential phase shift per unit length and may be expressed as $$\Delta\beta=\beta_+-\beta_-$$

Mathematical analysis for a slab of rectangular cross section in a wave of rectangular cross section has shown that $\Delta\beta$ is dependent upon the following factors:

$a$, the distance from the slab to an adjacent narrower wall of the wave guide, $4\pi M_s$, the saturation magnetization value for the particular composition of ferrite employed, $H_0$, the externally applied (or, permanent) magnetizing field, $\delta$, the thickness of the ferrite slab, and $\omega$, the angular value of the operating frequency in radians per second.

For certain applications, as for example a gyrator or a circulator, a total differential phase shift of 180 degrees or $\pi$ radians is desired.

Two ferrite slabs used together in parallel relationship in a wave guide may differ from each other as to the value of the saturation magnetization or in thickness, and they may differ as to the spacing with respect to the side wall of the wave guide. Furthermore, the externally applied magnetizing fields may be made of different strength at the two slabs. By means of any or all of these differences the numerical value of $\Delta\beta$ may be adjusted.

Figure 1:
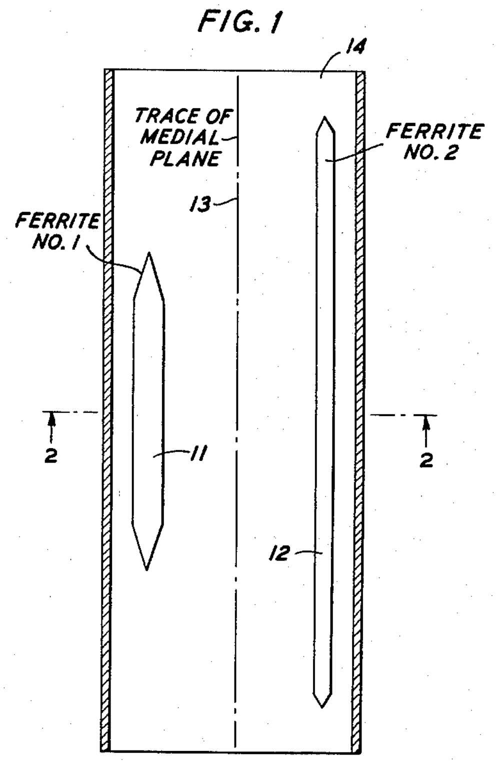
Fig. 1 is a plan view of a wave guide of rectangular cross section containing two ferrite slabs which differ in composition, thickness, and length.

In the arrangement of Fig. 1, two slabs 11 and 12 of gyromagnetic material of different compositions, implying in particular unequal values of $4\pi M_s$, are shown mounted on opposite sides of the medial plane (traced at 13) of a wave guide 14 of rectangular cross section indicated in plan view. Many varieties of ferrite are available as gyromagnetic materials but other gyromagnetic materials may be used. For brevity, the gyromagnetic materials herein mentioned will be designated as ferrites or ferrite slabs, without implying any limitation of the invention to the use of ferrites exclusively. The slabs are shown as being of unequal lengths and thicknesses while they are equally spaced from the respective adjacent side wall of the wave guide. The slabs are shown as tapered at the end but they may have square ends, if desired. The slabs are also shown as less than the full height of the wave guide, although they may be made full height, particularly for reasons hereinafter explained. For clarity, the magnetizing arrangements are shown in Fig. 2.

Figure 2:
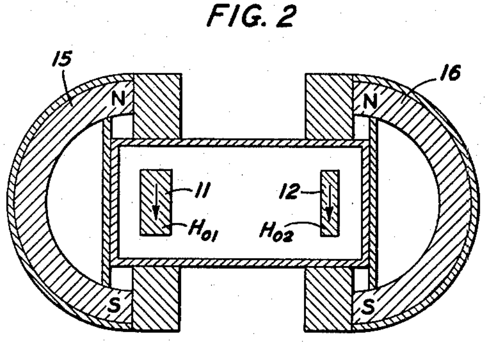
Fig. 2 is a cross-sectional view of the structure of Fig. 1 with addition of a showing of magnetizing means.

Fig. 2 is a cross-sectional view at the plane indicated by the broken line 2—2 in Fig. 1, with the addition of U-shaped magnet assemblies 15, 16 of conventional design. Either permanent magnets or electromagnets may be used or the ferrite slabs may be permanently magnetized, as desired. The magnets 15, 16 each extend preferably along the full length of the respective ferrite slabs 11 and 12. The polarities of the magnets are so selected that the direction or sense of the field externally applied to the ferrite slabs by the magnets is the same in both slabs. As shown, the north poles of both magnets are at the top of the wave guide. The south poles of both magnets could equally well be made uppermost instead of the north poles. The magnetizing fields are indicated by arrows accompanied by designations $H_{01}$ and $H_{02}$, respectively, indicating that the field strengths may be unequal.

Optimum designs may be found either by experiment, or, usually more economically by computation.

While the ferrite slabs may differ in length (as in Fig. 1) with resulting effect upon the value of $\Delta\beta$, there are various practical advantages in using slabs of equal length. For one thing, the wave equations are simplified in that the wave pattern does not change from point to point along the longitudinal axis of the wave guide. Simplification of the wave equations in turn simplifies and shortens the computations. Also, the wave guide system has a uniform value of $\Delta\beta$ independently of the length of the system provided the length is several times (say ten times) the wavelength in the guide so that long line theory is applicable. The uniform composite transmission line which results may then be cut to any desired length, the length required being proportional to the total differential phase shift desired.

It has been found advantageous from the standpoint of economy of computations, not only to assume ferrite slabs of equal length, but also to start with a tentative design in which two slabs of different composition and different thicknesses are placed at equal distances from the side walls of the wave guide, one on each side of the medial plane of the wave guide. The slabs are assumed to be the full length of the wave guide, also to simplify the theory and computations.

Figure 3:
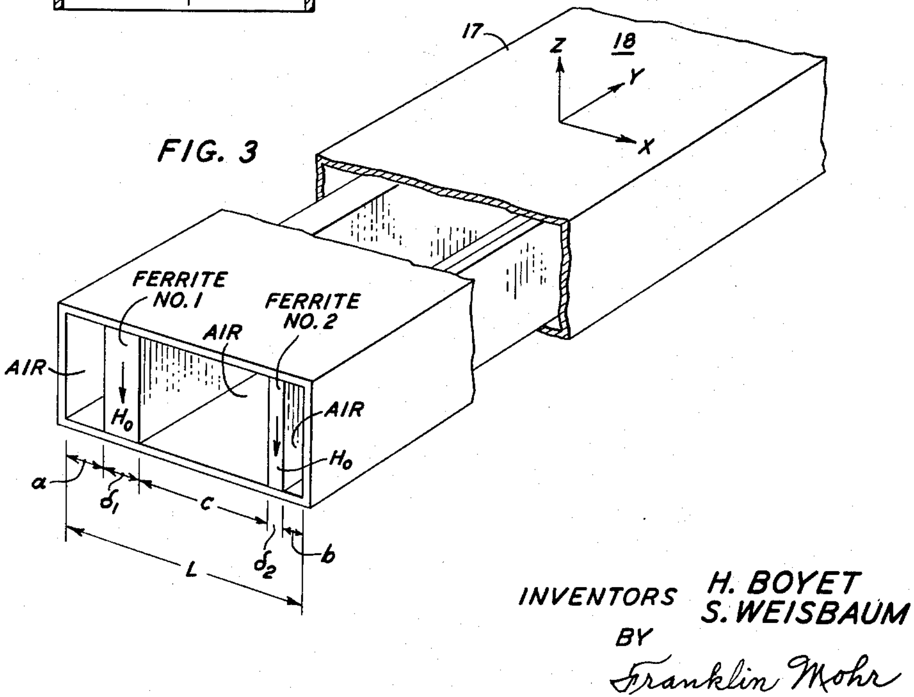
Fig. 3 is a perspective view of an axially uniform composite wave guide structure, partly broken away, with dimensions and air and ferrite regions indicated.

Fig. 3 shows in perspective view the general arrangement of ferrite slabs in a wave guide 17 upon which the theory and computations are advantageously based. The ferrite slabs are identified as being of materials designated Ferrite No. 1 and Ferrite No. 2, respectively, dividing the wave guide effectively into five regions, as shown from left to right, namely air (or other dielectric), Ferrite No. 1, air, Ferrite No. 2, air. The regions are designated in width as $a$, $\delta_1$, $c$, $\delta_2$, $b$, respectively, as shown, the total width of the wave guide being designated L. In general, $a$ and $b$ need not be equal. A conventional set of rectangular coordinate axes is shown at 18, the X-axis being transverse to the longitudinal axis of the wave guide. The Y-axis is directed parallel to the longitudinal axis of the wave guide. The Z-axis (of the right-handed system) then is directed vertically upward as shown.

In the mathematical analysis of the system of Fig. 3, the general procedure is that appropriate solutions of electric field intensity from Maxwell's electromagnetic wave equations are first set down for each region. From these, expressions are derived for the instantaneous values of the electric and magnetic field intensities of a traveling wave at each of the air-ferrite and ferrite-air boundaries. The solutions of the Maxwell equations are so chosen in the first place as to satisfy the boundary conditions at each side wall of the wave guide, i.e., sine waves of electric field intensity which come to the value of zero at each wall.

Satisfaction of the remaining boundary conditions (i.e. between air and ferrite) involves continuity of each of the two field intensities, electric and magnetic, at each of four boundaries, and thus leads to eight simultaneous homogeneous equations, the coefficients of which may be represented by a determinant of the eighth order (Fig. 4). If the field intensities are not all to be zero, the value of the determinant must be zero as is well known in the theory of homogeneous equations. The equation (Fig. 4) which results from setting the determinant equal to zero is a function of $\beta$, the phase shift per unit length in the direction of wave propagation and of a plurality of parameters.

In general, an explicit solution of the determinantal equation is not obtainable, but solutions may be approximated by trial and error. To make a trial solution, numerical values are assigned to all the parameters and a trial value is assigned to $\beta$. The resulting value of the determinant is computed, and if the value of the determinant is not zero, a new value of $\beta$ is inserted and the value of the determinant is computed for the new value of $\beta$, until a root is found. It has been found that when the value of $\beta$ inserted is not a root of the equation, the value of the determinant is either pure real or pure imaginary. Where a high speed computing device, e.g. an electronic computer, is available, trial solutions may be obtained with a reasonable expenditure of time and effort. It is found generally preferable that the geometry of the system be so chosen as to simplify the calculation so that it will be possible to test many designs by calculation with a saving in time and expense over building and testing a plurality of physical embodiments.

Positive roots are values of phase shift per unit length for wave propagation in one direction through the wave guide. Negative roots are for wave propagation in the opposite direction. The finding of multiple roots of either sign indicates that more than one wave mode is possible in the wave guide with the ferrite slabs included. Inasmuch as the presence of the ferrite in the wave guide profoundly modifies the number and wave pattern of the wave modes that can be transmitted in the wave guide, it is to be expected that even though the empty wave guide will propagate only the dominant mode, the ferrite-loaded wave guide may propagate two or more modes.

Useful guidance in methods of computing may be found in an article published by Prescott D. Crout, entitled "A Short Method for Evaluating Determinants and Solving Linear Equations with Real or Complex Coefficients," in the Transactions of the American Institute of Electrical Engineers, volume 60, 1941, pages 1235–1241.

Where multiple roots are found, the largest positive root and the largest negative root indicate the dominant mode in the respective directions of propagation. If it is desired to exclude all but the dominant modes, it may be possible to effect this result by using a wave guide of smaller width and recomputing the values of $\beta$ as before.

The largest positive root is the phase constant hereinbefore designated $\beta_+$, and the largest negative root is $\beta_-$, the difference being the differential phase shift $\Delta\beta$ for the dominant mode.

When a design has been found for which $\Delta\beta$ has a fairly large value, or is otherwise tentatively acceptable, the length of ferrite necessary to provide a desired amount of differential phase shift, such as $\pi$ radians or any other desired value will be easily calculated.

If the length calculated is unwieldy or undesirable, changes may be made in the assigned values of the parameters and new computations made.

When a suitable length has been found, or at any other stage, the design may be tested for degree of broadbandedness by computing $\Delta\beta$ at a plurality of frequencies distributed through the desired frequency band, e.g. at mid-frequency and at each band edge, to determine whether or not $\Delta\beta$ has sufficiently nearly the same value at all of the frequencies for which it is computed.

In a design program which was used and which has resulted in progressively improving designs for a $\pi$-radian device, the initial design had ferrite slabs which differed in the composition of the ferrite (having unequal values of $4\pi M_S$) and in the thickness of the slab. The slabs were equally spaced from the respective adjacent side wall of the wave guide. The externally applied magnetizing force was the same for each slab. After a few trial changes in the respective thickness values it was deemed unnecessary to make changes in any other parameters. If necessary in a given case, the designer has at his disposal variations in the spacings of the slabs from the side walls, different values of the externally applied magnetizing force, and unequal magnetizing forces on the respective ferrite slabs.

In one of the improved designs above referred to, the

Ferrite No. 1 had a value of 2500 gauss for $4\pi M_s$ and the Ferrite No. 2 had a value of 1700 gauss therefor. The thicknesses of the respective ferrite slabs were 0.20 and 0.37 inch. The spacing between the slab and the adjacent side wall of the wave guide was 0.20 inch for each side of the wave guide. The wave guide upon which the calculations were based was 1.59 inches by 0.795 inch in cross section. An externally applied magnetizing field strength of 400 oersteds was assumed for each ferrite slab. The calculations gave a length for the slabs of 5.32 inches for a differential phase shift of $\pi$ radians. Calculations at three frequencies, gave the following indication of the degree of broadbandedness:

| Frequency, in megacycles per second | $\Delta\beta$, in radians |
|---|---|
| 5925 | $0.966\,\pi$ |
| 6175 | $\pi$ |
| 6425 | $1.017\,\pi$ |

To illustrate the method of mathematical analysis the following details are recited with reference to a system such as that of Fig. 3.

The appropriate solutions of Maxwell's equations for the electric field intensity in the five regions are as follows:

| Region | Medium | Electric Field Intensity, $E_z$ (Factor $e^{-j\beta y}$ omitted in each) |
|---|---|---|
| 1 | Air | $A \sin k_a x$ |
| 2 | Ferrite No. 1 | $Ce^{jk_m x}+De^{-jk_m x}$ |
| 3 | Air | $E \cos k_a x+F \sin k_a x$ |
| 4 | Ferrite No. 2 | $C'e^{jk_m' x}+D'e^{-jk_m' x}$ |
| 5 | Air | $B \sin k_a(L-x)$ |

In these solutions, the quantities $k_a$, $k_m$, and $k_m'$ are wave numbers, pertinent to the $x$-direction and expressed in radians per unit of length. The $k$'s are determined by the operating angular frequency $\omega$, by the effective values of dielectric constant and permeability for the medium in question, and by the phase shift in the direction of the axis of the wave guide.

The wave number in air is $k_a$, which is determined by the relationship $$k_a^2=\omega^2\epsilon_0\mu_0-\beta^2$$

For Ferrite No. 1, the wave number is $k_m$ and the relationship is $$k_m^2=\frac{\omega^2\epsilon\mu_0}{\rho}-\beta^2$$

For Ferrite No. 2, the wave number is $k_m'$, and $$(k_m')^2=\frac{\omega^2\epsilon'\mu_0}{\rho'}-\beta^2$$

Here, $\epsilon_0$ and $\mu_0$ are the dielectric constants and the scalar permeability, respectively, for air, and $\epsilon$ and $\epsilon'$ are the dielectric constants of Ferrite No. 1 and Ferrite No. 2, respectively. The quantities $\rho$ and $\rho'$ are abbreviations of factors related to the tensor permeabilities of the Ferrites No. 1 and No. 2, respectively. For purposes of evaluating $\rho$ and $\rho'$ the following auxiliary formulas are needed:

$$\rho=\frac{\mu}{\mu^2-K^2}$$

$$\mu=1+\frac{4\pi M_s\gamma\omega_0}{\omega_0^2-\omega^2}$$

$$K=\frac{4\pi M_s\gamma\omega}{\omega_0^2-\omega^2}$$

$$\omega_0=\gamma H_0$$

$\gamma=2.8\times10^6$ cycles per second per oersted $$\mu'=1+\frac{(4\pi M_s)'\gamma\omega_0'}{(\omega_0')^2-\omega^2}$$

$$K'=\frac{(4\pi M_s)'\gamma\omega}{(\omega_0')^2-\omega^2}$$

$$\omega_0'=\gamma H_0'$$

If $H_0'$ is the same as $H_0$, then $$\omega_0=\omega_0'=\gamma H_0$$

Corresponding solutions of Maxwell's equations for the magnetic field intensity are derived from the solutions for the electric field intensity by the well known relations $$\left.\begin{aligned} B_x&=\frac{j}{\omega}\frac{\partial E_z}{\partial y}\\ B_y&=-\frac{j}{\omega}\frac{\partial E_z}{\partial x}\end{aligned}\right\}$$

In the case of air, $$H_y=\frac{B_y}{\mu_0}$$

In the case of ferrite, the tensor relationship between $H_x$, $H_y$, $B_x$, and $B_y$ is as follows:

$$\left.\begin{aligned} \mu H_x-jKH_y&=\frac{B_x}{\mu_0}\\ jKH_x+\mu H_y&=\frac{B_y}{\mu_0}\end{aligned}\right\}$$

which gives $$H_y=\frac{\mu B_y-jKB_x}{(\mu^2-K^2)\mu_0}$$

$H_x$ is not of present interest, as will be evident from application of the principle of continuity to the magnetic field intensities, since $H_x$ is perpendicular to the air-ferrite boundary plane, whereas $H_y$ is parallel to that plane.

The foundation so far established is sufficient to enable formulation of the longitudinal components of the magnetic field intensity in the respective regions as follows:

| Region | Medium | Magnetic Field Intensity, $H_y$ (Factor $e^{-j\beta y}$ omitted) |
|---|---|---|
| 1 | Air | $-\frac{jk_aA}{\omega\mu_0}\cos k_ax$ |
| 2 | Ferrite No. 1 | $\frac{\mu k_m}{(\mu^2-K^2)\omega\mu_0}(Ce^{jk_mx}-De^{-jk_mx}) -\frac{jK\beta}{(\mu^2-K^2)\omega\mu_0}(Ce^{jk_mx}+De^{-jk_mx})$ |
| 3 | Air | $-\frac{jk_a}{\omega\mu_0}(-E\sin k_ax+F\cos k_ax)$ |
| 4 | Ferrite No. 2 | $\frac{\mu' k_m'}{[(\mu')^2-(K')^2]\omega\mu_0}(C'e^{jk_m'x}-D'e^{-jk_m'x}) -\frac{jK\beta}{[(\mu')^2-(K')^2]\omega\mu_0}(C'e^{jk_m'x}+D'e^{-jk_m'x})$ |
| 5 | Air | $\frac{jk_aB}{\omega\mu_0}\cos k_a(L-x)$ |

The equations of continuity are as follows:

$$A\sin k_aa-Ce^{jk_ma}-De^{-jk_ma}=0$$

$$A(-jk_a\cos k_aa)-C\left(\rho k_m-\frac{jK\rho\beta}{\mu}\right)e^{jk_ma} +D\left(\rho k_m+\frac{jK\rho\beta}{\mu}\right)e^{-jk_ma}=0$$

$$Ce^{jk_m(a+\delta_1)}+De^{-jk_m(a+\delta_1)}-E\cos k_a(a+\delta_1) -F\sin k_a(a+\delta_1)=0$$

$$C\left(\rho k_m-\frac{jK\rho\beta}{\mu}\right)e^{jk_m(a+\delta_1)}-D\left(\rho k_m+\frac{jK\rho\beta}{\mu}\right)e^{-jk_m(a+\delta_1)} -Ejk_a\sin k_a(a+\delta_1)+Fjk_a\cos k_a(a+\delta_1)=0$$

$$E\cos k_a(L-b-\delta_2)+F\sin k_a(L-b-\delta_2) -C'e^{jk_m'(L-b-\delta_2)}-D'e^{-jk_m'(L-b-\delta_2)}=0$$

$$Ejk_a \sin k_a(L-b-\delta_2) - Fjk_a \cos k_a(L-b-\delta_2) - C'\left(\rho' k_m' - \frac{jK'\rho'\beta}{\mu'}\right)e^{jk_m'(L-b-\delta_2)} + D'\left(\rho' k_m' + \frac{jK'\rho'\beta}{\mu'}\right)e^{-jk_m'(L-b-\delta_2)} = 0$$

$$C'e^{jk_m'(L-b)} + D'e^{-jk_m'(L-b)} - B \sin k_a b = 0$$

$$C'\left(\rho' k_m' - \frac{jK'\rho'\beta}{\mu'}\right)e^{jk_m'(L-b)} - D'\left(\rho' k_m' + \frac{jK'\rho'\beta}{\mu'}\right)e^{-jk_m'(L-b)} - Bjk_a \cos k_a b = 0$$

The determinant set equal to zero is given in Fig. 4.

It is to be understood that the above-described arrangements are illustrative of the application of the principles of the invention and that numerous other arrangements may be devised by those skilled in the art without departing from the spirit and scope of the invention.

What is claimed is:

1. In a broad band nonreciprocal transmission system, a wave guide, a first element of magnetically polarizable material exhibiting the gyromagnetic effect at the operating frequencies and having given transmission characteristics mounted within the wave guide, a second element of magnetically polarizable material exhibiting the gyromagnetic effect at the operating frequencies and having different transmission characteristics from the first mounted within the wave guide on the opposite side of the medial plane of said wave guide from said first element and in the same longitudinal portion of said wave guide, and means producing a magnetizing field transverse to the direction of propagation of energy through said wave guide and through both said elements in the same sense, so that a desired over-all characteristic of the system is substantially equalized over an extended range.

2. In a broad band nonreciprocal transmission system, a wave guide, first and second slabs of magnetically polarizable material exhibiting the gyromagnetic effect at the operating frequencies characterized by unequal respective values of saturation magnetization mounted on opposite sides of the medial plane of the wave guide in parallel relation to each other and to the longitudinal axis of the wave guide, and means to apply magnetizing fields transverse to the direction of propagation of energy through said guide and in like sense to both said slabs.

3. In a broad band nonreciprocal transmission system, a wave guide of rectangular cross section, first and second ferrite slabs of rectangular cross section and of unequal thickness mounted on opposite sides of the medial plane of the wave guide in parallel relation to each other and to the said medial plane, said slabs being unequally spaced from the respective adjacent side walls of the wave guide, and means to apply magnetizing fields transverse to the direction of propagation of energy through said guide and of unequal strength in like sense to both said slabs.

4. In a broad band nonreciprocal transmission system, a wave guide, a first element of magnetically polarizable material exhibiting the gyromagnetic effect at the operating frequencies mounted within said wave guide on one side of the longitudinally extending medial plane thereof, the magnetic saturation of said element defining a first parameter of said transmission system, the displacement of said element from said medial plane defining a second parameter, the length of said element defining a third parameter, the transverse cross-sectional area of said element defining a fourth parameter, a second element of magnetically polarizable material exhibiting the gyromagnetic effect at the operating frequencies mounted within said wave guide on the opposite side of said medial plane from said first element and in the same longitudinal portion of said guide occupied by said first element, the magnetic saturation of said second element defining a parameter of said system corresponding to said first parameter, the displacement of said second element from said medial plane defining a parameter corresponding to said second parameter, the length of said second element defining a parameter corresponding to said third parameter, the transverse cross-sectional area of said second element defining a parameter corresponding to said fourth parameter, and means for applying a magnetic field transverse to the direction of propagation of energy through said guide and in the same sense to both said elements, the strength of said field applied to said first element defining a fifth parameter of said transmission system, the strength of said field applied to said second element defining a parameter corresponding to said fifth parameter, at least one of said parameters differing in magnitude from its corresponding parameter.

5. In a broad band nonreciprocal transmission system, a wave guide, a first element of magnetically polarizable material exhibiting the gyromagnetic effect at the operating frequencies mounted within said wave guide on one side of the longitudinally extending medial plane thereof, the magnetic saturation of said element defining a first parameter of said transmission system, the displacement of said element from said medial plane defining a second parameter, the length of said element defining a third parameter, the transverse cross-sectional dimensions of said element defining a fourth parameter, a second element of magnetically polarizable material exhibiting the gyromagnetic effect at the operating frequencies mounted within said wave guide on the opposite side of said medial plane and in the same longitudinal portion as said first element, the magnetic saturation of said second element defining a parameter of said system corresponding to said first parameter, the displacement of said second element from said medial plane defining a parameter corresponding to said second parameter, the length of said second element defining a parameter corresponding to said third parameter, the transverse cross-sectional dimensions of said second element defining a parameter corresponding to said fourth parameter, and means for applying a magnetic field transverse to the direction of propagation of energy through said guide and in the same sense to both said elements, the strength of said field applied to said first element defining a fifth parameter of said transmission system, the strength of said field applied to said second element defining a parameter corresponding to said fifth parameter, at least one of said parameters differing in magnitude from its corresponding parameter.

References Cited in the file of this patent

UNITED STATES PATENTS

| | | |
|---|---|---|
| 2,491,662 | Houghton | Dec. 20, 1949 |
| 2,741,744 | Driscoll | Apr. 10, 1956 |
| 2,745,069 | Hewitt | May 8, 1956 |
| 2,806,972 | Sensiper | Sept. 17, 1957 |

OTHER REFERENCES

Kales et al.: "A Non-Reciprocal Microwave Component," Journal of Applied Physics, vol. 24, No. 6, June 1953, pages 816–17.

Lax et al.: "Ferrite Phase Shifters in Rectangular Waveguide," Journal of Applied Physics, vol. 25, No. 11, November 1954, pages 1413–21.

Fox et al.: Bell System Technical Journal, vol. 34, No. 1, January 1955, pp. 65–75.